March 16, 1943.   R. U. LIPSCOMB ET AL   2,314,149
AUTOMATIC CENTER ADJUSTER
Filed Jan. 12, 1942
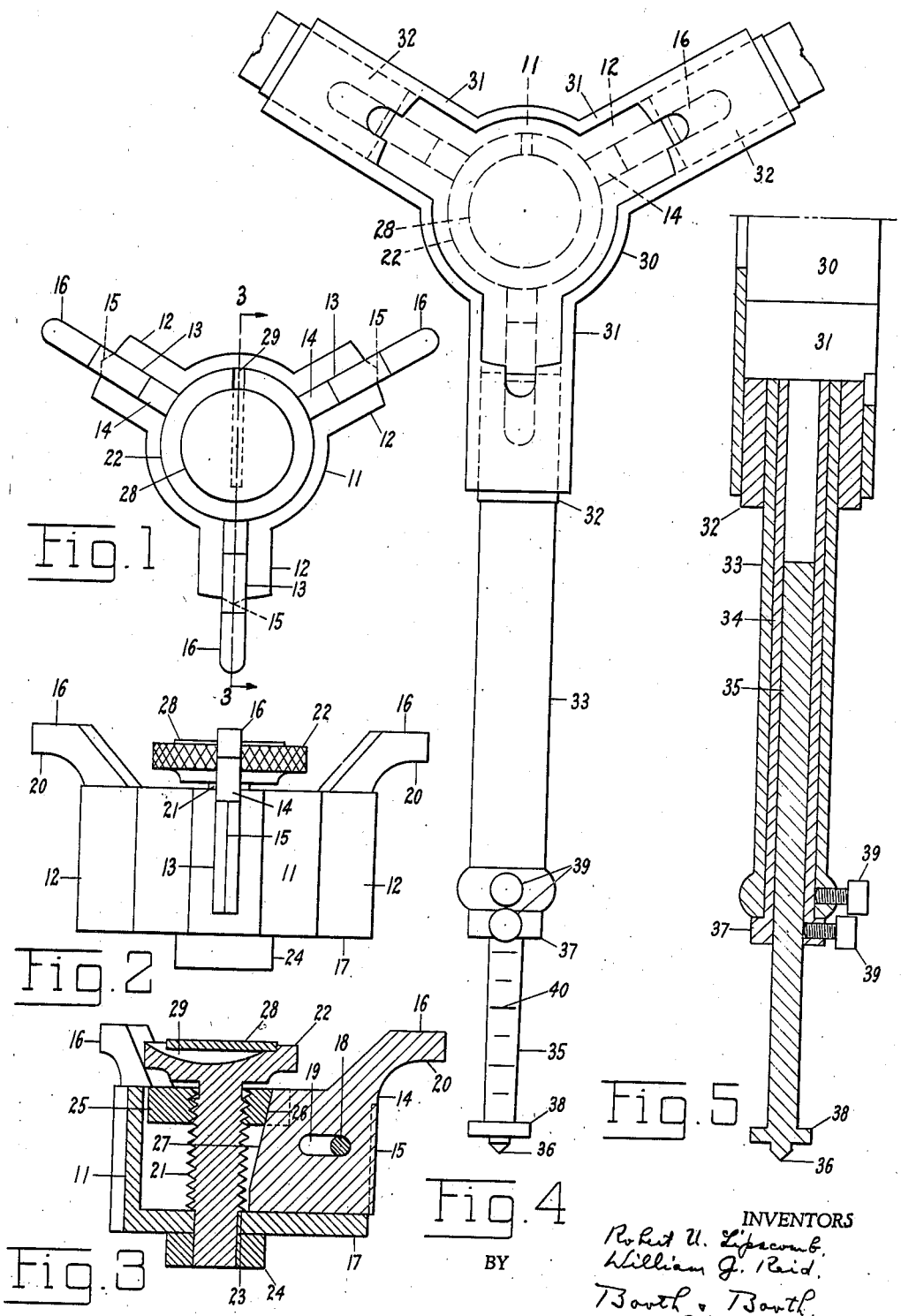
INVENTORS
Robert U. Lipscomb
William J. Reid
BY Booth & Booth
Attorneys Patented Mar. 16, 1943

2,314,149

UNITED STATES PATENT OFFICE 2,314,149

AUTOMATIC CENTER ADJUSTER

Robert U. Lipscomb and William G. Reid,
El Paso, Tex.

Application January 12, 1942, Serial No. 426,474

9 Claims. (Cl. 33—174)

The present invention relates to a centering tool especially adapted for establishing a working center for use in laying out and checking various parts of railway locomotives and other machines, such as hollow bored axles, cylinders, shaft bearings, connecting rod ends, etc.

The principal object of the invention is to provide a simple, accurate, and easily operated tool for the purpose described, to take the place of the usual wood, iron or lead strips which must be wedged in place individually. Another object is to provide a tool which, when once set, remains rigidly in place as long as required, without danger of being shifted by a slight jar or contact. Another object is to provide a tool that will not mar the finished surfaces of machine parts to which it is applied. A still further object is to provide a tool capable of being operated over a wide range of diameters, so that one tool will serve for centering many different parts. The use of our improved tool effects a great saving in time over usual shop methods, and results in greater accuracy of work.

These and other objects and advantages of the invention will be come apparent from the following description of a preferred embodiment thereof, which should be read with the understanding that changes, within the scope of the claims hereto appended, may be made in the form, construction and arrangement of the several parts, without departing from the spirit of the invention.

The accompanying drawing consists of the following figures:

Fig. 1 is a plan or top elevation of the inner or central portion of our centering tool without its outer extension portion.

Fig. 2 is a side elevation of the same.

Fig. 3 is a section on the line 3—3 of Fig. 1.

Fig. 4 is a plan or top elevation of the complete tool, the outer extension portion being shown in full lines and the inner or central portion being shown in broken lines, one of the extension arms being shown in full and the other two being broken away.

Fig. 5 is a longitudinal section of one of the arms of the extension portion.

Our complete tool comprises an inner or central tool portion, which carries the automatic adjusting mechanism and three comparatively short fingers, which can be used alone in the bores of machine parts whose diameter does not exceed the maximum reach of said fingers, and a removable outer portion or extension device which can be affixed to the inner tool portion to extend the effective reach of its fingers.

The inner tool portion, shown particularly in Figs. 1, 2 and 3, comprises a cylindrical body 11 having three equally spaced radial projections 12, each provided with a vertical slot 13. In each slot there is mounted, for radial sliding movement, a finger 14 consisting of a flat plate having a V-shaped outer edge 15, and an outwardly projecting hook 16 at its upper end. The bottom of the body 11 is closed by an end plate 17 which serves as a guide for the fingers 14, and said fingers are further guided and limited in their movement by pins 18 fixed in the body and working in slots 19 in the fingers.

The fingers are moved outwardly, simultaneously, by adjusting mechanism to be described presently, until their outer edges 15 are in contact with the bore of the machine part to be centered. The outwardly projecting hooks 16, which have flat lower surfaces 20, may contact the end face of the machine part to serve as stops when setting the tool, and also may be used to insure uniform setting when several tools are used, as when tramming locomotive driving wheels.

An adjusting screw 21, with a knurled knob 22 at its upper end, extends axially through the body 11 and through a central bearing in the bottom plate 17. A shoulder 23 on said screw above the plate 17, and a collar 24 thereon below said plate, retain the screw against endwise movement. The threads of the screw are preferably left-hand, and engage a nut 25 which has three peripheral notches, one of which is shown at 26, engaging the fingers 14. The bases of said notches are inclined, and the inner edges of the fingers 14 are correspondingly inclined, as shown at 27, so that as the nut is moved downwardly, by turning the screw in a clockwise direction, the fingers are moved outwardly.

The head 22 of the adjusting screw is provided with a shallow circular socket in which a lead disk 28 is seated and held by friction. A slot 29 extends from the edge of the head toward and beyond its center, so that a tool can be inserted beneath the lead disk to pry it out for replacement. The lead disk has a smooth surface on which lines or other marks designating the exact center can be inscribed.

When it is desired to use the tool in bores of larger diameter, an outer portion or extension device is removably fitted to it. This extension device, shown particularly in Figs. 4 and 5, comprises a body 30 having a central bore into which the body 11 of the inner tool portion fits accurately. Three projections 31 are provided about the body 30, to receive the projections 12 of the body 11. The outer ends of the projections 31 are formed as guides, within which are slidably mounted blocks 32 whose inner ends contact the outer edges of the fingers 14.

A tubular arm 33 is secured to and extends radially outward from each sliding block 32. Within each arm is a slidable tube 34, and within each tube 34 is a slidable rod 35, the latter terminating in a point 36. Flanges 37 and 38 at the outer ends respectively of the tube 34 and rod 35 limit their inward movement, and set screws 39 retain them in any desired position. The telescoping extension arms thus formed can be extended or retracted as desired, to accommodate the tool to bores of varying diameters. The rods 35 are provided with indicating marks 40, and the tubes 34 are provided with similar marks (not shown), so that all three arms can be extended by the same amount. The arms are set individually to uniform length, and then are all forced out simultaneously to final position by the fingers 14 which bear against the inner ends of said arms.

In setting our tool in a bore of comparatively small diameter, the inner portion only is used, without the extension device. The adjusting screw 21 is first turned to raise the nut 25, and the fingers 14 are pressed inwardly by hand. The tool is then placed in the bore to be centered, and the screw 21 is turned in the opposite direction until the fingers contact firmly the sides of the bore. The tool remains in place, without shifting, for as long as may be desired. The exact center can be marked upon the lead disk 28.

When the tool is used in a bore of large diameter, such as a locomotive cylinder, the inner portion is fitted into the outer extension body 30, the fingers 14 are retracted, and the telescoping extension arms are pulled out and set at equal lengths by the set screws 39. Then the arms are pressed inwardly into contact with the fingers 14. The complete tool is placed in the bore to be centered, and the adjusting screw is turned, forcing the fingers 14, slide blocks 32, and extension arms out until the outer ends of said arms contact the walls of the bore. This centers the bodies 30 and 11 in the bore, and the exact center can be marked upon the lead disk 28.

We claim:

1. A centering tool comprising an inner body member, a plurality of radially movable fingers projecting outwardly therefrom, means for moving said fingers, an outer body member removably surrounding the inner body member, and a plurality of radially movable arms carried by and extending outwardly from the outer body member, said arms being moved by said fingers.

2. A centering tool comprising an inner body member, a plurality of radially movable fingers projecting outwardly therefrom, means for moving said fingers, an outer body member removably surrounding the inner body member, and a plurality of radially movable arms carried by and extending outwardly from the outer body member in alignment with said fingers, the inner ends of said arms engaging said fingers whereby said arms are moved by said fingers.

3. A centering tool comprising an inner body member, a plurality of radially movable fingers projecting outwardly therefrom, means for moving said fingers, an outer body member removably surrounding the inner body member, a plurality of radially movable arms carried by and extending outwardly from the outer body member, said arms being moved by said fingers, and each of said arms comprising a plurality of sections relatively movable lengthwise one upon another, whereby the length of said arms may be adjusted independently of their movement by said fingers.

4. A centering tool comprising an inner body member having a plurality of radially disposed guideways, fingers mounted for sliding movement in said guideways, means centrally positioned within said body and engaging said fingers to move them outwardly, an outer body member removably surrounding the inner body member, and a plurality of radially movable arms carried by and extending outwardly from the outer body member, said arms being moved by said fingers.

5. A centering tool comprising a body member having a plurality of radially disposed guideways, fingers mounted for sliding movement in said guideways, a rotatable screw positioned axially within said body, an axially movable non-rotatable nut on said screw, said nut and the inner ends of said fingers having mutually engaging inclined faces whereby said fingers are moved outwardly by the axial movement of said nut.

6. A centering tool comprising a body member having a plurality of radially disposed guideways, fingers mounted for sliding movement in said guideways, a rotatable screw positioned axially within said body, an axially movable nut on said screw, said nut having peripheral notches engaging said fingers to hold said nut against rotation, the inner ends of said fingers and the bases of said notches having mutually engaging inclined faces whereby said fingers are moved outwardly by the axial movement of said nut.

7. A centering tool comprising a body member, a plurality of radially slidable fingers projecting therefrom, each finger having an outer edge parallel with the axis of said body, a hook fixed to each finger extending outwardly beyond said outer edge at one end thereof, and means within said body engaging said fingers to move them simultaneously.

8. A centering tool comprising a body member, a plurality of radially slidable fingers projecting therefrom, each finger having an outer edge parallel with the axis of said body and an inner edge inclined with respect to said axis, guide means for said fingers, and an axially movable member centrally positioned within said body and engaging the inclined inner edges of said fingers to move them outwardly.

9. A centering tool for hollow objects comprising a body member having a plurality of radially disposed slots forming guideways extending through its outer surface, fingers slidably mounted in said guideways, each finger being in the form of a substantially flat plate having an outer edge adapted for contact with the interior surface of the object to be centered, each finger having a hook projecting outwardly beyond said outer edge at one end thereof, said hooks being positioned for contact with the end of said object.

ROBERT U. LIPSCOMB.
WILLIAM G. REID.